Aug. 1, 1961  D. E. STEARNS  2,994,484
METHOD AND APPARATUS FOR CONVERTING A STREAM
OF LIQUID INTO A SPRAY
Filed Jan. 3, 1956  2 Sheets-Sheet 2
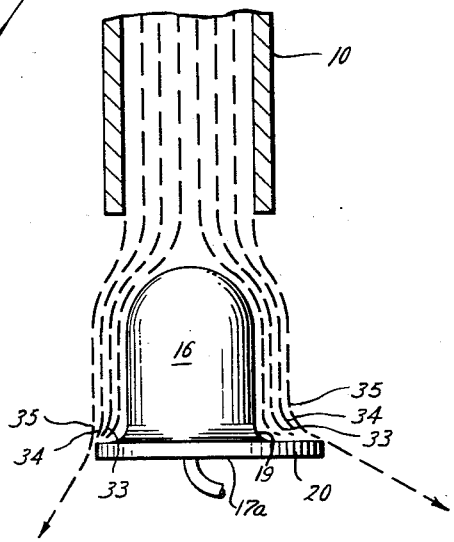
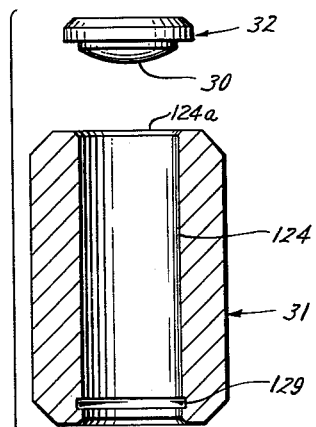
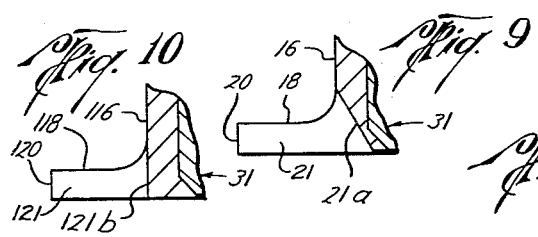
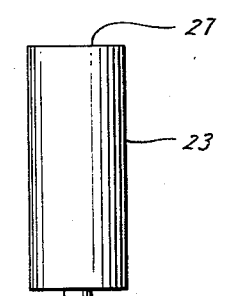
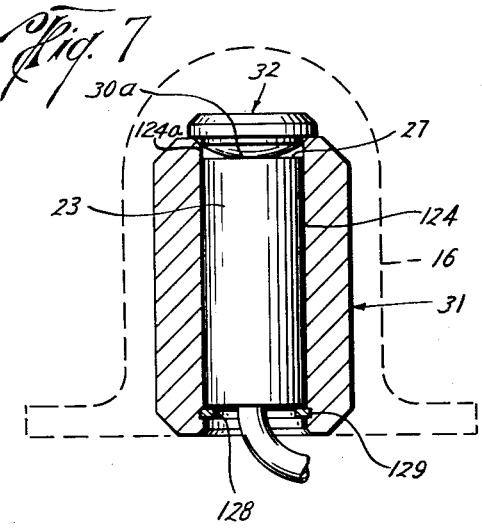
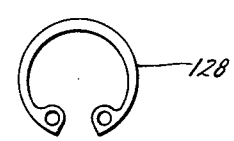
Dick E. Stearns
INVENTOR.
BY
Browning Simms + Hyer
ATTORNEYS

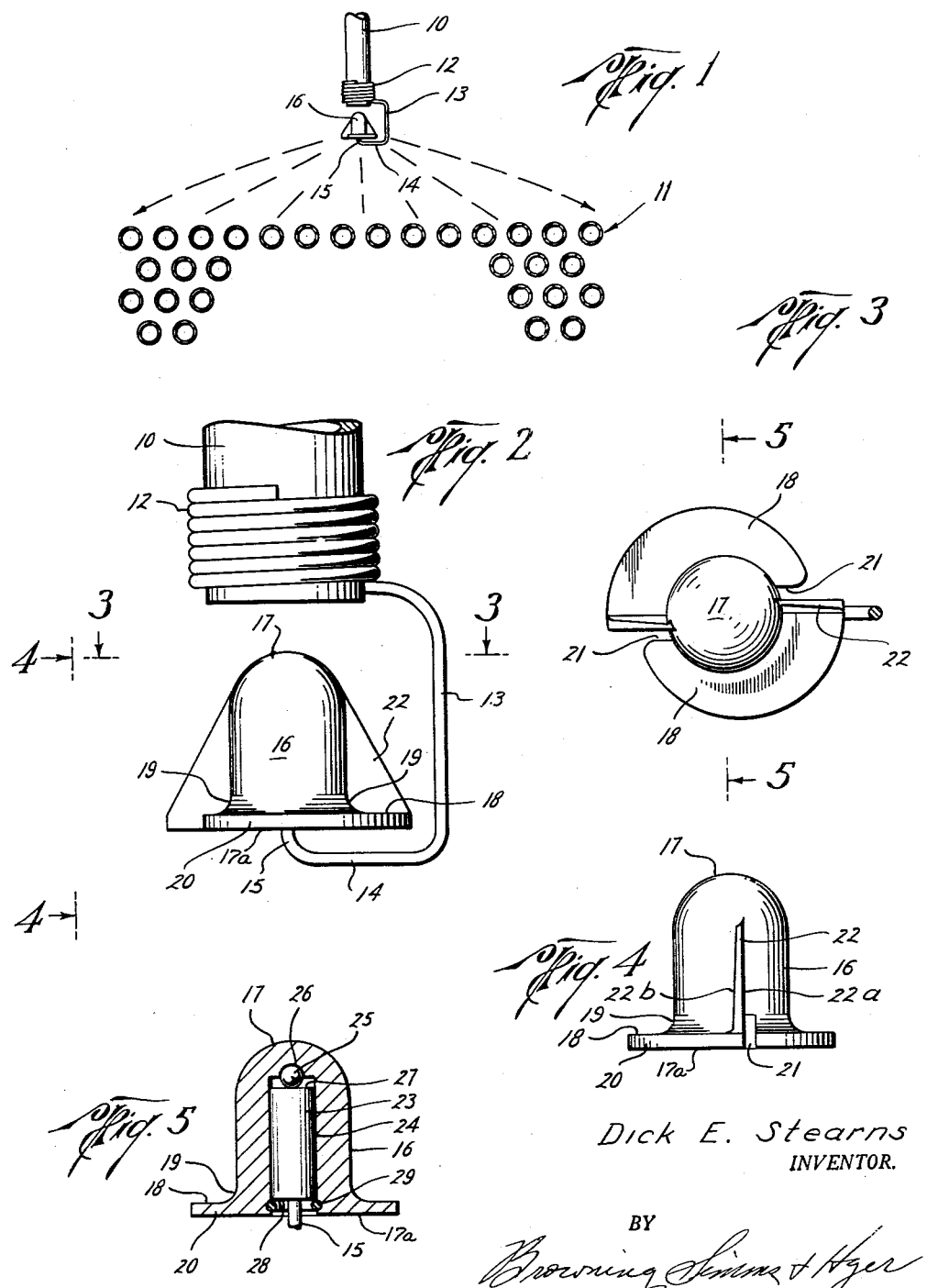

United States Patent Office 2,994,484
Patented Aug. 1, 1961

2,994,484
METHOD AND APPARATUS FOR CONVERTING A STREAM OF LIQUID INTO A SPRAY
Dick E. Stearns, P.O. Box 1234, Shreveport, La.
Filed Jan. 3, 1956, Ser. No. 556,900
3 Claims. (Cl. 239—386)

This invention relates to a method and apparatus for distributing a stream of liquid in a spray and more particularly to a method and apparatus particularly adapted for low pressure service. It constitutes an improvement upon the disclosure of my prior copending application, Serial No. 456,265, filed Sept. 15, 1954, now Patent No. 2,785,013, issued March 12, 1957.

One of the primary difficulties with spray heads heretofore available for low pressure service is that a substantial change in pattern occurs with changes in head pressure on the stream being distributed. For instance, in low pressure gravity feed apparatus such as industrial cooling towers, air conditioning cooling towers, spray ponds, etc., it is desirable to maintain a constant controlled spray pattern because the efficiency of a heat exchanger is impaired both by starving an area by insufficient liquid and by blanketing an area with too much liquid. Blanketing an area with too much liquid interferes with free evaporation and in this way impairs efficiency of the unit. It is very difficult to maintain a constant head pressure on the stream being distributed in such apparatus. Thus, it has heretofore been very difficult to maintain the desired constant pattern in such apparatus because the spray heads used provided a varying pattern with variations in head pressure of the stream being distributed.

It is therefore an object of this invention to provide a method and apparatus for distributing a vertical downcoming stream of water in which variations in the spray pattern on any horizontal plane thereunder due to changes in head pressure on the stream are minimized.

Another object is to provide a method and apparatus for distributing a low pressure stream in which the spray pattern remains substantially constant with changing flow rates.

Another object is to provide a method and apparatus for distributing a stream of liquid which will furnish a controlled, even, spray pattern at low pressures and maintain substantially the same pattern with changes in pressure.

Another object is to provide a method and apparatus for deflecting a stream of water to provide a spray in which the spray pattern is primarily determined by the direction of flow of the several layers of the stream so that changes in velocity of flow of the stream will have little effect upon the spray pattern.

Another object is to provide a method and apparatus for distributing a stream of water in which the stream is first converted to a tubular stream and then the inner layers of the tubular stream are deflected outwardly into the outer layers of the stream and the spray pattern is primarily determined by the resultant direction of the merging layers of the stream.

Another object is to provide a spray head for distributing a stream in which the spray head rotor is self-cleaning.

Another object is to provide a spray head which will distribute a spray pattern substantially uniformly over its entire coverage area from the center out to the edge of its pattern.

A further problem of low pressure installations is to provide a means for positively starting rotation of the spray rotor and at the same time preventing overspeeding of the rotor.

Another object is to provide a spray head having a liquid redirecting surface with a vane for positively imparting rotation to the spray head rotor which rotor may be readily formed by molding of a plastic material.

Another object is to provide a rotary spray head for distributing a stream of water over a wide area in which the rotor will always start and yet will not overspeed.

Another object is to provide a spray head having a vane for imparting positive rotational movement to the spray head rotor in which the vane also acts as a brake to prevent overspeeding of the spray head rotor.

Another object is to provide a spray head having a vane extending substantially in the direction of flow of the stream to be distributed in which the trailing face of the vane is engaged by water flowing over the spray head rotor and the forward face of the vane is not engaged by water flowing over the spray head rotor except as the vane may be rotated into the water flowing over the rotor so that water engaging the trailing face of the vane imparts rotation to the rotor and rotation of the forward face of the vane into water flowing over the rotor will provide a brake to prevent overspeeding of the rotor.

Spray head rotors are preferably made of plastic material such as nylon, and have heretofore been supported against thrust load by a metal ball running between a socket in the rotor body and the end of a shaft on which the rotor is rotatably mounted. This type of bearing is generally satisfactory, but in high temperature installations the nylon is subject to cold flow under the continuous thrust load and undesirable deepening of the socket sometimes occurs.

It is therefore another object of this invention to provide a bearing assembly for use with a plastic rotor body in which thrust load does not cause cold flow of the bearing assembly into the rotor body under elevated temperature conditions.

Another object is to provide a thrust bearing for a spray head rotor having relatively movable thrust bearing surfaces in which wear is from a small area of contact to a relatively large area of contact in which the initial point of wear is automatically aligned with the rotational axis of the rotor.

Another object is to provide a bearing assembly for a spray head rotor in which there is provided a sufficiently large area of thrust load transfer area between the plastic body and thrust bearing to prevent cold flow of the plastic body.

Another object is to provide a thrust and journal bearing assembly for a plastic spray head rotor in which the thrust and journal bearing parts carried by the rotor are connected together to provide a large area of thrust load transfer between the plastic body and thrust bearing to prevent cold flow of the plastic body.

Another object is to provide a thrust bearing and journal for a spray head in which the area of contact of the thrust bearing surfaces when the rotor is first placed on service is substantially less than after the bearing has "wore in" to provide for low initial friction of the thrust bearing surfaces while the journal surfaces wear in.

Other objects, features and advantages of this invention will appear from time to time from a consideration of the drawings, the specification and the appended claims.

In the drawings, wherein like reference numerals indicate like parts and wherein there is shown an illustrative embodiment of this invention:

FIG. 1 is an elevational view of a spray head constructed in accordance with this invention secured to a downcomer for supplying the stream of water to be spread into a spray and positioned over tubes of an atmospherically cooled tube bundle such tubes being shown in transverse cross-section;

FIG. 2 is an elevational view of the spray head of FIG. 1 on a much larger scale;

FIG. 3 is a view taken along the lines 3—3 of FIG. 2;

FIG. 4 is a view taken along the lines 4—4 of FIG. 2;

FIG. 5 is a view along the lines 5—5 of FIG. 3 showing one form of bearing assembly for the spray head;

FIG. 6 is a view in vertical elevation of the rotor of the spray head with the vanes omitted and in a vertical downcomer in longitudinal cross-section thereabove, illustrating the manner in which a stream from the downcomer is acted upon by the rotor;

FIG. 7 is a view on a larger scale partly in vertical cross-section and partly in elevation through a preferred modification of bearing assembly for the spray head with the main body of the rotor shown in phantom;

FIG. 8 is an exploded view of the several parts of the bearing assembly of FIG. 7;

FIG. 9 is a view in vertical cross-section through a fragment of a spray head rotor illustrating the preferred slot construction for distributing liquid below the spray head; and FIG. 10 is a view in vertical cross-section through a fragment of a spray head rotor illustrating another slot construction for distributing liquid below the spray head.

Referring now more in detail to the drawings, the numeral 10 in FIG. 1 illustrates a downcomer pipe from which is adapted to be discharged a downcoming approximately cylindrical stream of liquid of a cross sectional diameter predetermined by the size of the pipe, said stream to be distributed by the spray head of this invention over the tube bundle indicated generally at 11 below the downcomer pipe 10. As will be understood by those skilled in the art, a sump (not shown) will be positioned below the tube bundle and a suitable pump and conduits will pick up water from this sump and deliver it to a distributing pan (also not shown) which opens into a plurality of downcomers 10 and water in this manner will be circulated throughout a tower of considerable size in which a number of the spray heads of this invention will be employed to distribute the water over the tube bundle or bundles to be cooled.

The spray head may be supported from the lower end of the downcoming pipe 10 by means of a support formed of a wire formed with a helical coil 12 adjacent its upper end, this coil comprising several convolutions as may be desired and being wound originally to a slightly smaller diameter than the outer diameter of the pipe 10 so that by being slightly uncoiled it may be placed over the lower end of the pipe 10 and then released to grip the pipe 10 sufficiently tight to support the spray head. Extending from the lower end of this coil 12 and preferably an integral portion of the wire of the coil is a downwardly projecting length of wire 13 which extends to a point a substantial distance below the lower end of the pipe 10, at which point it turns radially inwardly towards the axis of the pipe 10 as shown at 14 and thence upwardly substantially coaxially with the pipe for a short distance as indicated at 15. A bearing assembly is provided at the upper end of wire 15 to rotatably support the spray head rotor presently to be described.

Referring now to the spray head rotor, it will be seen to comprise a first body portion 16 which is preferably cylindrical and mounted coaxially with the downcomer pipe 10 for rotation about its cylindrical axis as illustrated, and is of the diameter of the downcoming stream of liquid adapted to be discharged by said pipe. The upstream end 17 of the body is streamlined to convert the cylindrical stream from downcomer 10 into a tubular stream which will flow about the cylindrical portion 16 of the body. This tubular stream will have an inner diameter or bore the same as the cylindrical body portion 16, and a radial thickness such that its cross sectional area will be the same as that of the downcoming cylindrical stream emerging from the pipe 10. Preferably, the streamlined portion is a hemispherical shape and of the same radius as the cylindrical body portion 16 as illustrated. The hemispherical shape is preferred as it has proven to be completely self-cleaning and algae or other foreign matter in the downcoming stream will not cling to the rotor but will be washed therefrom by the stream. It will be appreciated that with the hemispherical shape of substantially the same radius as the downcoming cylindrical stream, any foreign matter in the stream will not likely be large enough to be impaled on the body 16, but will be free floating and will be spun off the rotor by centrifugal force due to rotation of the rotor. While the hemispherical nose is preferred for cleanliness purposes, the streamlined nose may be any desired shape which will convert the cylindrical stream into a tubular stream without splashing of the liquid from the rotor.

Positioned at the downstream extremity 17a of the body portion 16 and extending transversely of the tubular stream of water flowing over the cylindrical portion of the body is a second portion providing a liquid redirecting surface 18. As best shown in FIG. 3, there are preferably two of these surfaces 18 extending circumferentially about body 16 so that the rotor will be in dynamic balance. The cylindrical portion 16 of the body and the liquid redirecting surface 18 are joined together by a fillet 19 which provides for a smooth turning of the inner layers of the tubular stream from the vertical direction to a direction parallel to the redirecting surface 18. Fillet 19 may be considered to be a part of the redirecting surface as turning of the inner layers of the tubular stream is begun by the fillet.

The liquid redirecting surface 18 is provided by a pair of ledges 20, which ledges and surface 18 preferably extend normal to the direction of flow of the tubular stream and of the downcomer pipe 10. The redirecting surface 18 is also preferably flat radially outwardly of its juncture with fillet 19. The ledges 20 and redirecting surface 18 have a radial dimension, that is, the dimension beginning at the periphery of body 16 and extending radially outwardly therefrom along extended radii of the body, which will cause the inner layers of the tubular stream to be turned outwardly into the outer layers of the tubular stream without turning all of the layers of the stream to a direction paralleling the surface 18, and the resultant of these converging layers of the stream is the direction of the stream as it departs from the outer extremity of ledges 20. The number of inner layers or the percentage of the tubular stream which is turned outwardly to parallel or substantially parallel the liquid redirecting surface 18 will determine the angle of the resulting spray. Therefore, the ledges and liquid redirecting surface may be formed with a changing radial dimension to provide a changing pattern of discharge spray to wet an entire area below the spray head. The ledges, therefore, terminate at their outer extremity in circles generated about an offset center relative to the center of the rotor body 16. In the one-inch model, this center is approximately ⅛ inch from the rotational axis. In other words, the radial dimension of each ledge in its curved dimension about the rotor body will be of a constantly reducing value and a constantly increasing spray angle from the horizontal will result.

As noted above, two liquid redirecting surfaces are provided for purposes of dynamic balance. Just before the trailing end of one ledge reaches the leading end of the other ledge, the trailing end turns sharply into the cylindrical portion of the body to provide slots 21 through which some of the tubular stream of water may flow to spray the area directly below the rotor and in the circle immediately adjacent to the point below the spray head.

Referring to FIG. 9, it is pointed out that slots 21 preferably are formed with a bottom wall 21a which is a continuation of the peripheral wall of cylindrical body portion 16 and which converge in a downwardly direction to terminate in the down stream end of the rotor, in other words, at the lower face of ledge 20 at points radially inward from the peripheral wall of cylindrical section 16. Liquid flowing along the periphery of cylindrical section 16 will adhere to bottom wall 21a of groove 21 and be directed inwardly toward the rotational axis of the rotor as the liquid leaves the rotor. The two streams from slots 21 will converge and merge below the rotor and after merging fall straight down to cover the area below the rotor. This form is preferred as it insures a spray below the rotor where the installation is such to provide for considerable free fall of spray.

Referring to FIG. 10, slot 121 in ledge 120 is formed with a bottom wall 121b which extends straight down from the peripheral wall of cylindrical section 116 of the body and, in effect, forms a continuation thereof. This form does not direct liquid back toward the axis of rotation of the rotor, but as a practical matter, sprays the area directly below the rotor where the rotor is positioned close to the tube, spray pond, etc.

As will be understood by those skilled in the art, water flowing down the cylindrical body 16 or 116 and out onto the redirecting surface 18 or 118 will tend to follow the line of least resistance. As the liquid redirecting surface is of a constantly changing radial dimension and there is less resistance to flow over a short radial distance than over a long radial distance, the liquid will tend to flow toward the shorter distance and the reactive force will tend to impart rotation to the rotor. At the larger radial dimension portion of the rotor, that is, the leading edge, vane 22 provides a weir which will also tend to cause water to flow towards the short radial dimension of the liquid redirecting surface and impart by reactive force rotational movement to the rotor.

Vanes 22 are carried by the rotor to impart positive rotational movement to the rotor and to prevent overspeeding of the rotor. Vanes 22 are positioned in front of and extend substantially parallel to a plane including the axis of rotation of rotor body 16 or 116 with the leading face 22a of the vane extending parallel to such plane and the trailing face 22b inclined slightly relative to such plane so that the leading and trailing faces of the vane converge in a direction away from the redirecting surface 18 or 118. This convergence permits ready removal of the spray head from a mold and the inclined trailing face provides a slight wedge face which is acted upon by the tubular stream of water to impart movement to the body due to the wedge action. However, the primary reason for the tubular stream of water imparting movement to the rotor due to the vanes is because the vanes are positioned slightly ahead of center, that is, slightly ahead of the diametral plane. In operation water flowing radially out from the center of rotation and over the hemispherical nose will engage the trailing face of the vane but will not engage the leading face of the vane unless the rotative speed of the rotor is such as to move the rotor into the tubular stream ahead of the vane. The arrangement is also one in which the radial dimension of the vane might be said to be inclined rearwardly from a diametral plane of the rotor which included the juncture of the vane and cylindrical portion of the body. In other words, the radially extending portion of the vane would diverge outwardly from such diametral plane. As water flowing outwardly along the liquid redirecting surface will seek to flow radially outwardly of the body except as it is influenced to turn toward a portion of the liquid redirecting surface having a shorter radial dimension due to the reduced resistance of flow in such direction, the water turned outwardly by the redirecting surface at the vane will contact the vane which will act in the manner of a wedge and the reactive force will impart rotation to the rotor.

Under some conditions the rotor may tend to speed up and rotate at too high a speed and the leading edge of the vane would then be rotated into contact with the tubular stream of water and act as a brake. Also, water flowing rearwardly, that is, to the direction of rotation, from the trailing edge of the liquid redirecting surface will strike the leading edge of the vane if the rotor is traveling at too high a speed and will act as a dampener or brake.

Referring now to the bearing means for rotatably supporting the rotor and first to FIG. 5, it will be seen that a cylindrical shaft 23 is carried by the portion 15 of the mounting wire. This shaft 23 is received within and is substantially the same radius as a bearing bore 24 extending from the downstream side of the body into the body but terminating short of the upstream end of the body. A ball 25 is received in a semispherical socket 26 in the bottom of bore 24 and engages the confronting end 27 of shaft 23. The engagement of the peripheral wall of shaft 23 and bore 24 rotatably positions the rotor concentric with the downcoming stream and the ball 25 forms a thrust bearing to reduce friction due to the downward force on the rotor and permits rotational movement of the spray head. A split ring 28 is received in a groove 29 adjacent the mouth of bore 24 and locks the shaft within the bore of the spray head. Ball 25 may be a very hard alloy such as tungsten carbide so that wear will be in the end face 27 of shaft 23 which may be fabricated of a softer material such as stainless steel.

While the FIG. 5 form of journal assembly is generally satisfactory, the tough resilient nylon from which the rotor body is preferably fabricated has been found to be subject to cold flow under elevated temperature conditions sometimes encountered in industrial cooling water and permits ball 25 to deepen socket 26 and, in effect, permits ball 25 to flow into the nylon an undesirable amount.

Referring now to FIGS. 7 and 8 in which there is shown the preferred bearing structure for supporting a spray head rotor, the cylindrical shaft 23 is identical with the FIG. 5 embodiment. The cylindrical bearing bore 124 and groove 129 may be formed in a journal bushing 31, and split ring 128 is carried in groove 129. The thrust bearing for this form of bearing support is different and provides an arrangement in which the thrust bearing surfaces originally in contact with each other when the rotor is first placed on service are automatically positioned coincident with the rotational axis of the rotor. The area of original contact is relatively small to provide minimum friction while the journal surfaces are wearing in so that small irregularities in the journal surfaces may be smoothed out without impairing operation of the rotor. The thrust load transfer is accommodated in a manner which eliminates the problem of cold flow under elevated temperature conditions.

The small area of original contact is preferably provided by closing the bottom or upper end 124a of bore 124 with a part having a convex surface 30, best seen in FIG. 8, thereby forming the bottom of the bore 124 which bears against the end 27 of shaft 23, which end provides a cooperating thrust part. Convex part 30 is formed with a radius larger than the radius of bore 24 so that the bearing contact area will initially be very small but will at first rapidly increase with wear. The shaft 23 abuts the convex bottom 124a of the bore at the rotational axis of the body and the surface 27 is non-conforming to surface 30. Thus, as convex portion 30 "wears in," the successive additional areas of contact will be ring-like and of larger area as they will be spaced radially equally from the center of rotation.

In order to insure that bearing wear will be on the part of the convex bottom of the bore, this convex portion and also preferably the portion of the body forming the bore 124 are formed of a material which is relatively softer than the material of the shaft. For instance, the body around the bore and part providing the convex bottom of the bore are preferably formed of copper impregnated graphite and the shaft formed of steel. Other requirements which this graphite material satisfies are chemical inertness to industrial cooling water, self-lubricated in a manner compatible with water service, a very low coefficient of friction and high impact strength.

Preferably, the bearing assembly includes a journal bushing indicated generally at 31 formed of copper impregnated graphite to provide the bore 124 for receiving the shaft 23. A button closure of the same material, indicated generally at 32 constitutes the part providing the convex bottom of the bore, is formed separately from the bushing for ease of manufacture and has a press fit in the end of bushing 31 which is tight enough to prevent the button being separated from the journal bushing 31 during operation of the rotor. Closure 32 provides the convex thrust bearing part 30. These parts are placed in their assembled relationship and then the main body of the spray head, which may be of tough, resilient nylon, molded thereabout as indicated by the phantom lines of the main body of the spray head in FIG. 7.

When the spray head is placed on service the bearing parts will be of the shape indicated in FIG. 8. After the spray head is worn in, the central portion of the convex surface 30 of the bottom of the bore will be worn flat as shown in FIG. 7 at 30a to provide a supporting area for receiving the thrust exerted on the spray head. Wear will be rapid until the convex surface has been worn to provide a sufficient area to support the rotor without excessive wear. Once this area has been obtained, further wear of the thrust bearing will be very slow and a long life bearing will result. Although the bearing area may approach the area of the end of the shaft as a limit, it will, in all practical usage, always be less than the area of the end of the shaft.

With the closure 32 provided with a convex bearing surface, it will be appreciated that initial contact between end 27 of the shaft 23 and the convex bearing surface 30 and therefore the initial point of wear will automatically be at a point coincident with the rotational axis of the rotor. Thrust load will always be balanced and there will be no tendency for thrust load to cock and bind the rotor as would be the case were the initial point of wear off-center. Initial thrust friction will be low and any irregularities in the journal bearing will be smoothed out in the wear-in period before the bearing surfaces attain maximum contact area and a substantial amount of the available torque may be utilized to overcome journal bearing friction during the wear-in period.

The large area contact of closure 32 with the nylon body will reduce any tendency of the plastic to cold flow under continuous load and as the closure and journal 31 are press fitted together, thrust load will also be transmitted between the plastic body and closure through the journal 31. The combined areas of contact of the closure and journal, and plastic portion of the body is so large that no problem of cold flow will exist when this form of bearing assembly is used.

Models of the spray head disclosed in this application have been constructed in the one-half, one, and two-inch sizes (diameter of cylindrical section of rotor) and it was found that the relationship between the diameter of the stream issuing from the downcomer pipe, the diameter of the cylindrical section of the body and the radial dimension of the ledge are so related that substantially the same spray pattern over any horizontal plane thereunder was obtained from the three spray heads of different sizes when the relationship of the diameter of the stream, the diameter of the cylindrical section of the rotor, and the radial dimension of the ledge were maintained proportional. A rotor having a cylindrical section diameter of one inch and a redirecting surface varying in radial dimension from 0.5" to 0.25" and constructed as shown in the drawings has been extensively tested and has recently gone into commercial use. Such a rotor when used with a downcomer provided by a one-inch standard pipe will provide a spray leaving the rotor ledge at an angle of approximately 30° from the horizontal at the widest point on the ledge and this angle will increase progressively to the narrowest point on the ledge. While maximum control of spray with varying head pressure is obtained at approximately a 45° angle from the horizontal, practical considerations such as available head space above the tube bundle make the use of a rotor giving 30° spray preferable. The dimensions of the other two models tested are as follows: The half-inch rotor for use with the half-inch pipe was provided with the ledge having a maximum radial dimension of approximately 0.25" reducing to approximately 0.125". The diameter of the cylindrical section of this rotor was one-half inch. The two-inch rotor for use with two-inch pipe was provided with a two-inch diameter cylindrical section and a ledge having a maximum radial dimension of approximately 1.0" reducing to approximately 0.5". By calculation, using the values of ½", 1" and 2" as the diameter of the downcoming stream for the one-half inch, one-inch and two-inch rotors respectively, the radial thickness of the tubular stream, that is, the thickness in a radial direction of the wall of water around the cylindrical portion of the body, formed by the streamlined nose and cylindrical portion of the body for a half-inch pipe is approximately 0.103", for a one-inch pipe 0.207", and for a two-inch pipe 0.414". From these values it will be seen that a preferred embodiment employs a liquid redirecting surface which is at its radially widest point approximately 2.42 times the radial thickness of the tubular stream and at its narrowest point approximately 1.21 times the radial thickness of the tubular stream. Of course, from this narrow point the ledge narrows abruptly to zero to provide slot 21.

It was found that as the size of the downcomer and spray head was increased, the spray pattern remained substantially constant but the droplets increased in size. It was also found that the one-half inch spray head tended to rotate somewhat more rapidly than the others.

From the above exemplary models, it will be seen that the dimensions of the spray head are related to the radial thickness of the tubular stream and, therefore, the dimensional specification for a rotor for use with any desired size downcomer pipe may be determined by the following formula:

$$T = \frac{\sqrt{D^2 + d^2} - d}{2}$$

where T is equal to the radial dimension of the liquid redirecting surface at its smallest radial dimension before it abruptly turns into the cylindrical portion of the rotor; D equals the diameter of the downcoming cylindrical stream of water to be sprayed, that is, the I.D. of the downcomer pipe; and d equals the diameter of the cylindrical portion of the rotor. As the desired maximum radial dimension of the ledge is twice the minimum dimension, then the maximum dimension of the ledge where it joins a vane would be equal to 2T. As a rotor having a ledge with a constantly reducing radial dimension from 2T to T will provide the desired spray pattern, it will be apparent that the ledge might extend to a dimension which is slightly greater or slightly less than these values and still provide satisfactory results. Thus, for instance, the maximum ledge dimension might be 1.5T and the spray angle for the widest point on the ledge somewhat greater than 30° from the horizontal. On the other hand, the maximum ledge dimension might be more than 2T and the spray angle would be less. It might be found that the spray would be more concentrated in certain areas of the surface to be wet than in others but so long as a major portion of the ledge, that is, a major portion of its circular dimension about the rotor lies between T and 2T, it is believed that satisfactory results will be attained. At any rate, a portion of the ledge which has a radial dimension of between T and 2T will give a spray pattern control which is largely independent of the head of the stream of water being controlled and accomplish the objectives of this invention. As will be pointed out more fully below, these ledge dimensions cause the stream to leave the ledge at definite angles which are not greatly influenced by the head of water on the stream being sprayed because they do not depend upon this head for attaining the desired direction of the spray.

Referring now to FIG. 6, the method of converting the stream of downcoming liquid into a spray is diagrammatically represented. The flow lines are particularly diagrammatical and are only intended to indicate in general the path of flow of the several layers of liquid. Liquid from the downcomer pipe is first converted into a tubular stream. This may be done by action of the streamlined nose of the spray head which forces the downcoming stream to assume a tubular shape or possibly before the stream reaches the rotor. Then as the stream flows along the cylindrical first portion of the body the innermost layers of liquid will be slowed due to friction and this will, of course, cause the tubular stream of water to have a slightly larger O.D. than would be true of a theoretical stream. As the stream reaches the redirecting ledge, it is turned by the redirecting ledge on the second portion of the body to an amount depending upon the radial dimension of the ledge. The innermost layers as indicated at 33 of the stream follow the fillet 19 and are smoothly turned to a direction substantially paralleling the redirecting surface 18. A more intermediate layer will be turned somewhat by the action of an inner layer and will travel in a direction somewhat in between the vertical and horizontal as indicated at 34. The outermost layers will retain more of their original direction of flow as indicated at 35. By comparison of the action of the fluid flowing over the ledge to the left-hand of the rotor of FIG. 6 with that flowing over the ledge to the right-hand of the rotor of FIG. 6, it will be seen that the short radial length ledge turns the tubular stream to a lesser degree than is the case with the ledge having the greater radial dimension. The resultant direction of flow of liquid is closer to the horizontal in the case of the wide ledge than in the case of the narrow ledge. Of course, at an intermediate value of ledge dimension, that is, somewhere intermediate T and 2T, the ledge would be capable of turning the layers of water to a greater extent than with the ledge of T dimension but less than the ledge of 2T dimension and, therefore, the resultant angle of spray leaving the ledge would be at an intermediate value. It might be said that there is provided a means (liquid redirecting surface) for turning inner layers of the tubular stream outwardly and then this means is removed (by terminating) so that the turned layers of water may thereafter flow in a path determined by the result of forces generated by turning different layers of water different amounts.

It will be seen from the above that the angle to which the layers of liquid are turned is determined by the relationship of the cross-sectional thickness of the tubular stream of water and the radial dimension of the liquid redirecting surface. The tubular cross-sectional thickness of the stream of water is in turn determined by the diameter of the cylindrical stream to be sprayed and the diameter of the cylindrical portion of the body. Thus, by varying any one of these three values the resultant direction of spray and hence the spray pattern will be varied.

It has been determined that while the flow rate varies with the head of water on the downcomer pipe the pattern remains substantially constant with varying heads of water and from an operational standpoint the pattern will not be varied a substantial amount with a water head ranging from two to ten feet for a one-inch downcomer pipe. As industrial cooling water is usually delivered from the downcomer under a head of from two to ten feet, the pattern may be considered constant from an operational viewpoint.

From the above it will be seen that there has been provided a method of controlling a stream of water to provide a spray and an apparatus for performing such method in which all of the objects of this invention have been attained. The pattern control is dependent upon the dimensions of the apparatus used and not upon the head of the stream of water being converted into a spray. There has been provided a spray head which is self-cleaning and is positive starting and yet is prevented from running at too high a rate of speed. There has also been provided a novel bearing structure for supporting the spray head which is usable under elevated temperature conditions and which provides in a novel way for smoothing out the bearing surfaces.

It will be appreciated that while this invention has been explained in the setting of industrial water cooling apparatus, the invention may be utilized in any apparatus in which its mode of operation will be found advantageous.

It will also be apparent that the spray head of this invention, while designed and intended for use with an approximately cylindrical downcoming stream of liquid, may be used with other shapes of streams in an imperfect practice of the invention.

From the foregoing it will be seen that this invention is one well adapted to attain all of the ends and objects hereinabove set forth, together with other advantages which are obvious and which are inherent to the method and apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In combination with means for producing a downcoming stream of liquid of predetermined diameter, a spray head adapted for distributing said stream over a substantially horizontal area comprising, a body support and bearing fixed with respect to said means, a body rotatably mounted on said support for rotation on an axis substantially coincident with the axis of said stream, said body having a cylindrical portion with a diameter substantially the same as said stream and concentric with said axis and having a streamlined convex rounded upstream end to convert the stream into a tubular stream with an inner diameter substantially that of the downcoming stream, said body having thereon a liquid redirecting surface in the path of the tubular stream and extending transversely of said path, said surface having a radial dimension through the major portion of its extension about the body not substantially less than one-fourth the diameter of the cylindrical portion of the body and not substantially greater than one-half the diameter of the cylindrical portion of the body, a portion of the outer edge of said surface being varied from a first point of greater radius from said axis to a second point of lesser radius from said axis spaced circumferentially from said first point.

2. The spray head of claim 1 in which said body has a bore extending into the body from its lower extremity and said support and bearing has a shaft extending into the bore to rotatably support the body, and endwise confronting parts carried by the body and shaft to form a thrust bearing for the load urging the shaft into the bore, one of said parts being formed of more readily wearable material than the other and progressively increasing in cross-sectional area from a point coincident with the rotational axis of the body and in a direction away from the other part whereby wear of the more readily wearable part provides a progressively larger area surface contact between said parts.

3. The spray head of claim 1 in which said body has a plurality of slots therein interrupting said liquid redirecting surface and beginning at the periphery of the cylindrical body upstream of the redirecting surface and extending to the downstream extremity of the body, the bottom wall of each slot being inclined downwardly and inwardly to direct streams of liquid toward the rotational axis of the body at a point below the body to provide a spray directly below the body.

References Cited in the file of this patent

UNITED STATES PATENTS

| | | |
|---|---|---|
| 538,008 | Burns | Apr. 23, 1895 |
| 961,006 | Perry | June 7, 1910 |
| 974,176 | Newman | Nov. 1, 1910 |
| 1,128,697 | Levy | Feb. 16, 1915 |
| 1,307,875 | Parker | June 24, 1919 |
| 1,481,327 | Merseles | Jan. 22, 1924 |
| 2,785,013 | Stearns | Mar. 12, 1957 |

FOREIGN PATENTS

| | | |
|---|---|---|
| 381,445 | Germany | Sept. 20, 1923 |